United States Patent [19]
Johnson et al.

[11] Patent Number: 5,678,743
[45] Date of Patent: Oct. 21, 1997

[54] TRUCK BED EXTENDER

[76] Inventors: Brian K. Johnson, R.R. 1, Box 219; Jerry R. Johnson, 605 W. Main, both of Goreville, Ill. 62939

[21] Appl. No.: 663,557

[22] Filed: Jun. 13, 1996

Related U.S. Application Data

[63] Continuation of Ser. No. 269,693, Jul. 1, 1994, abandoned.

[51] Int. Cl.⁶ ............... B60R 9/045; B60R 9/06
[52] U.S. Cl. ........... 224/485; 224/405; 224/501; 224/510; 224/521; 224/523; 224/537; 224/486; 296/26
[58] Field of Search .............. 224/521, 405, 224/485, 484, 486, 487, 501, 510, 523, 537; 296/3, 26

[56] References Cited

U.S. PATENT DOCUMENTS

| | | | |
|---|---|---|---|
| 4,856,686 | 8/1989 | Workentine | 224/521 |
| 5,120,102 | 6/1992 | Cumbie | 296/26 |
| 5,267,748 | 12/1993 | Curran | 224/521 |
| 5,451,088 | 9/1995 | Broad | 296/26 |
| 5,458,389 | 10/1995 | Young | 296/26 |

*Primary Examiner*—Linda J. Sholl
*Attorney, Agent, or Firm*—Grace J. Fishel

[57] ABSTRACT

A truck bed extender mountable in a receivable trailer hitch has an elongated support bar and a rack. The rack has a horizontal cross bar that is vertically adjustable on the support bar at the end opposite that where the support bar is secured to the receiver trailer hitch.

3 Claims, 2 Drawing Sheets

TRUCK BED EXTENDER

This is a continuation of application Ser. No. 08/269,693, Jul. 1, 1994 now abandoned.

BACKGROUND OF THE INVENTION

1. Field of the Invention

The present invention relates to a bed extender for a pickup truck.

2. Brief Description of the Prior Art

Pickup trucks are frequently employed by commercial users for carrying commonly used materials such as lumber, siding, plastic pipe, conduit, etc., which comes in lengths that are often more than twice the length of the flat bed portion of the truck. When loaded in a typical pickup, the materials bend at the unsupported end and, if the center of gravity is outside the rear of the truck, must be weighted down.

The manufacturers of pickup trucks have partially recognized the need to carry long loads by providing trucks in two basic lengths, i.e. the standard bed and the so-called long bed, but even the long bed is inadequate for many commonly encountered materials. For longer loads, one must use an overhead rack, typically mounted in some manner to the bed of the truck. Such racks are cumbersome and are not easily removable, which is a problem since the truck is frequently used for hauling other things. Different racks, not mounted in the bed, are attached to the tailgate or to the frame of the truck, typically requiring that special holes be drilled or that parts be welded or bolted on.

Many pickup trucks are furnished with a receiver trailer hitch such as are sold the under the trademark REESE, DRAWTIGHT, etc. It would be desirable if there was a bed extender for a pickup truck that could be easily attached to an already existing receiver trailer hitch in a manner that made the rack easy to remove. This would obviate the need for making any modifications in the truck and permit the easy removal of the bed extender when it is not needed, which could then be stored in the cab of the truck if it came apart in appropriate sized sections, ready for use when required.

SUMMARY OF THE INVENTION

In view of the above, it is an object of the present invention to provide a bed extender that attaches to a pickup truck having a receiver trailer hitch. It is another object to provide a bed extender that can be easily removed when it is not needed and stored, ready for use when required. Other objects and features of the invention will be in part apparent and in part pointed out hereinafter.

A bed extender in accordance with the invention is provided for a pickup truck having a receivable trailer hitch, a flat bed and a rear tailgate, which tailgate moves between an upright closed position and an open, generally horizontal extended position from the flat bed. The bed extender has an elongated support bar and a rack. The support bar has first and second ends with the support bar removably secured to the trailer hitch at its first end and having an open ended generally vertical receiver at its second end. The rack has a horizontal cross bar with first and second ends and is supported by a leg which is slidably received in the open ended receiver. There are means for removably securing the leg in the receiver, transverse the support bar, and for adjusting the height of the horizontal cross bar with respect to the flat bed.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
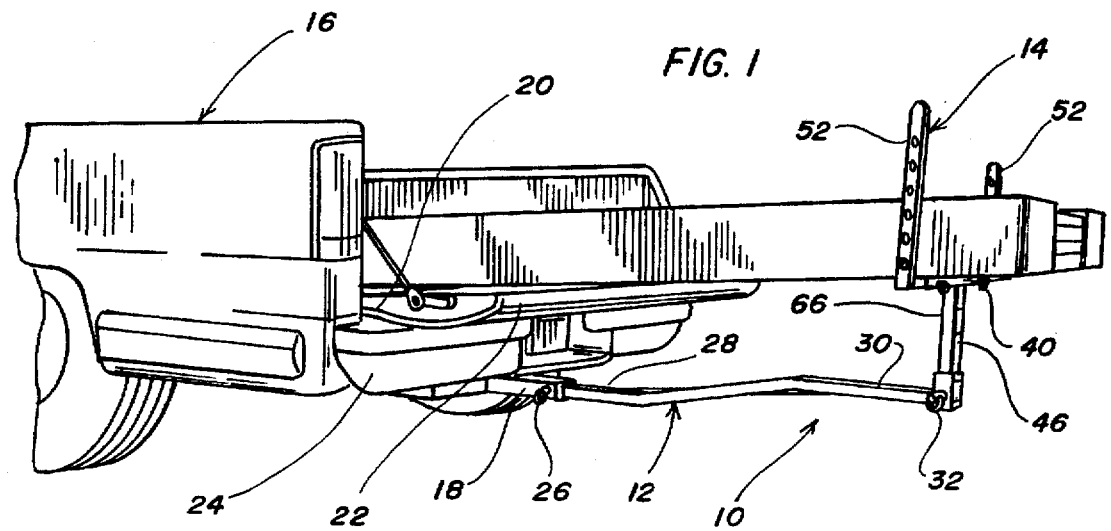
FIG. 1 is a perspective view of a bed extender in accordance with the present invention mounted on a pickup truck with a receiver trailer hitch.

Referring to the drawings more particularly by reference character, a bed extender 10 in accordance with the present invention includes an elongated support bar 12 and a rack 14. Bed extender 10 is adapted for use on a pickup truck 16 having a receiver trailer hitch 18 such as are sold under the trademark REESE, DRAWTIGHT, etc. As shown in FIG. 1, truck 16 has a flat bed 20, a rear tailgate 22 and a bumper 24. Tailgate 22 moves between an upright closed position and an open, generally horizontal extended position from flat bed 20. Receiver trailer hitch 18 is formed from hollow tubing having a square external and internal cross-section and is normally centrally attached to the frame of truck 16, below rear bumper 24. On most pickups, the internal cross-section of the receiver is 2 inches or, on some small trucks, 1¼ inches. Receiver trailer hitch has generally horizontal paired holes for receipt of a hitch pin 26 by means of which a trailer or bed extender 10 can be attached.

Figure 3:
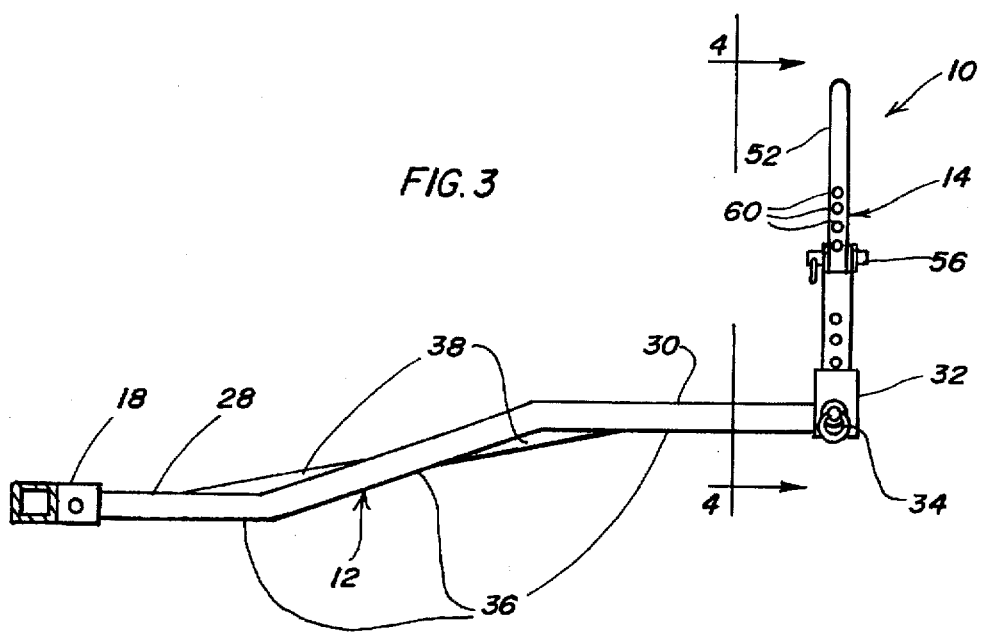
FIG. 3 is a side view of the bed extender as shown in FIG. 1.
Figure 4:
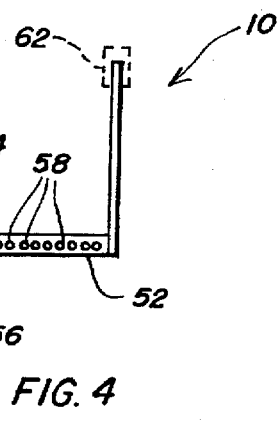
FIG. 4 is a section taken along line 4—4 in FIG. 3.
Figure 5:
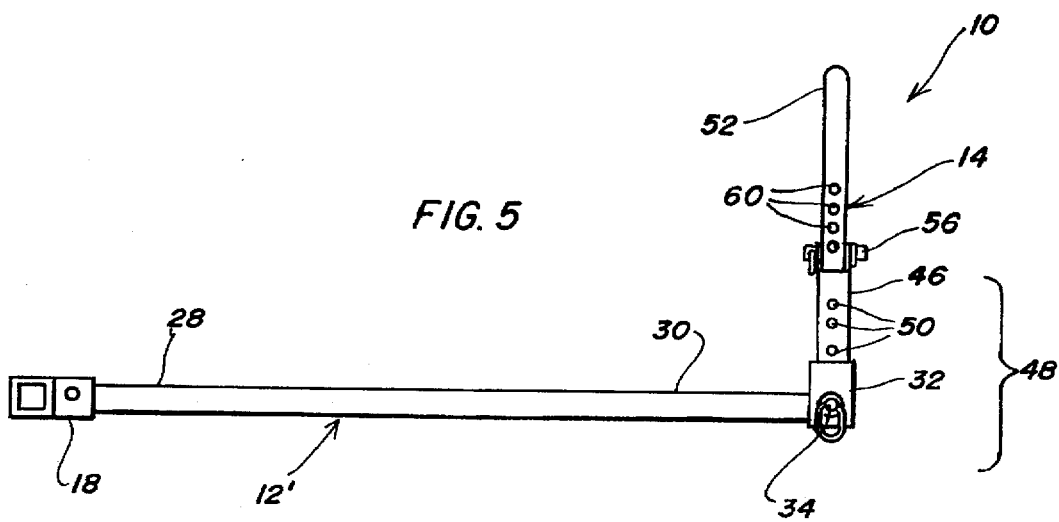
FIG. 5 is a side view of a second bed extender in accordance with the present invention.

Elongated support bar 12 is cantilevered from receiver trailer hitch 18 and has a first and second ends 28, 30, respectively, the first of which is adapted to be received and retained in the trailer hitch by hitch pin 26. Elongated support bar 12 is preferably formed of hollow square tubing, sized at first end 28 to be slidingly received in receiver trailer hitch 18 and provisioned with generally horizontal paired holes through which hitch pin 26 passes. A generally vertical open ended receiver 32 is fixedly attached by welding or the like to second end 30 and, like the trailer hitch, is preferably formed of square tubing with generally horizontal paired holes for receipt of a second hitch pin 34. Elongated support bar 12 may be formed with telescoping sections and, as shown in FIG. 5, it may be straight or, as shown in FIG. 3, angled so that receiver 32 is elevated. When angled, segments 36 may be reinforced with gussets 38, said gussets being generally mirror images of each other.

Rack 14 has a horizontal cross bar 40 with first and second ends 42, 44, respectively. Horizontal cross bar 40 is supported by a leg 46 to which it is fixedly attached, preferably midway its length, by welding or the like. Leg 46, like elongated support bar 12, is preferably formed of square tubing and is slidingly received in open ended receiver 32. A means 48 is provided for removably securing leg 46 in receiver 32 and for adjusting the height of horizontal cross bar 40 with respect to flat bed 20. To this end, leg 46 may be provisioned with a plurality of spaced apart holes 50 through which second hitch pin 34 passes when aligned with the holes in open ended receiver 32. In a preferred form, a pair of upwardly directed L-shaped arms 52 are slidingly received in horizontal cross bar 40 with first and second ends 42, 44 preferably having paired holes for receipt of third and fourth hitch pins 54, 56 respectively. The horizonal sections of L-shaped arms 52 are preferably formed of square tubing and have a plurality of spaced apart holes 58 through which third and fourth hitch pins 54, 56 pass when aligned with the holes in horizontal cross bar 40 for adjusting the spacing between said arms. The vertical section of L-shaped arms 52 may also be provided with a plurality of spaced apart holes 60 for use as described hereinafter. The tips of L-shaped arms 52 may be covered with a plastic or rubber cap 62 (e.g., applied by dipping the vertical sections of L-shaped arms 52 in molten plastic or the like) and the top surface of horizontal cross bar 40 may be provided with a plastic or rubber pad 64 to avoid marring goods loaded on the bed extender. Hitch pins 26, 34, 54 and 56 may be any typical fastener secured with a cotter pin, bolt, etc.

An embodiment of bed extender 10 having an elongated support bar 12 that is 60 inches long with a 7 inch rise and a rack 14 adjustable to 50 inches (e.g., to carry a sheet of plywood or drywall) weighs less than 50 pounds when made of steel tubing having a wall thickness of 3/16 inch. At this weight, preferably, the tubing forming elongated support bar 12 has an outside cross-section of 2 inches, open ended receiver 32 an inside cross-section of 2 inches, leg 46 an outside cross-section of 2 inches, horizontal cross bar 40 an internal cross-section of 1½ inches and horizontal sections of L-shaped arms an external cross-section of 1½. An adapter may be provided if receiver trailer hitch 18 has an internal cross-section less than 2 inches (e.g., 1¼). While the foregoing is preferred and will work with most pickups, elongated support bar 12 and rack 14 may be made of any cross section or thickness material as long as the desired structural strength is achieved, preferably with minimum weight. The length and angle of elongated support bar 12 should be such that rack 14 is at a sufficient distance from tailgate 22 to permit the tailgate to move without interference between an upright closed position and an open, generally horizontal extended position from flat bed 20. Bed extender 10 may be painted a bright color, such as international orange, so that it does not blend with the truck and reflectors 66 may be attached to rack 14, supplemented with a red flag when the load exceeds the legal limit.

Bed extender 10 can be stored behind the driver's seat or in flat bed 20, ready for use when required, with L-shaped arms removed from horizontal cross bar 40, leg 46 removed from open ended receiver 32 and elongated support bar 12 detached from receiver trailer hitch 18. When needed, elongated support bar 12 is mounted in receiver trailer hitch 18 with hitch pin 26, leg 46 bearing horizontal cross bar 40 slidably received in open end receiver 32 and L-shaped arms slidably received in open ended horizontal cross bar 40. The height of horizontal cross bar 40 is adjusted level with flat bed 20 with second hitch pin 34 and the spacing between L-shaped arms adjusted with third and fourth hitch pins 54, 56. Goods are then loaded on the truck, supported at the end extending away from the truck by horizontal cross bar 40 and, if desired, secured with a bungee cord or the like hooked into holes 60 in L-shaped arms 52. When no longer needed, bed extender 10 is taken apart and stored as before. While bed extender 10 is designed for use on a pickup truck, it will be apparent that it can be used on a van, station wagon or other such vehicle with a rear door (preferably center opening or hinged from the top) and a receiver trailer hitch (as opposed to a conventional fixed ball-type).

Figure 2:
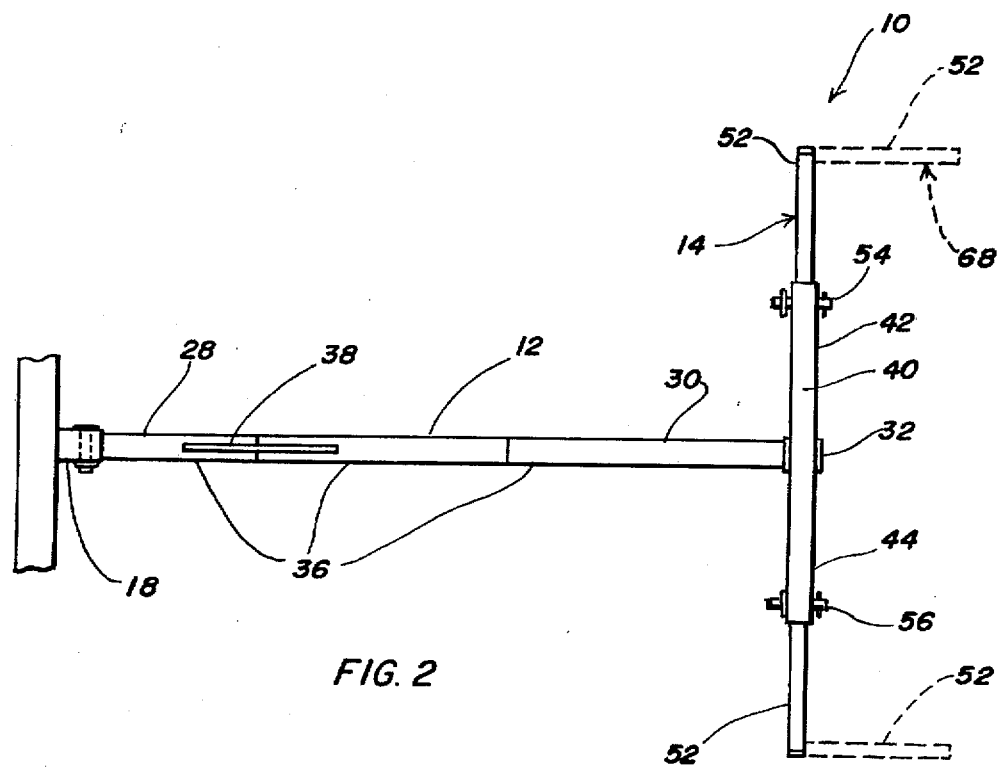
FIG. 2 is a top view of the bed extender as shown in FIG. 1, shown as a work platform in dotted lines.

When L-shaped arms 52 are formed of square tubing having two pairs of orthogonal holes, the arms can be slidable received in open end horizontal cross bar 40 as shown in dotted lines in FIG. 2 so as to form, with horizontal cross bar 40, a portable work platform 68. The top surface of the work platform is at a height generally level with flat bed 20 and the plane of the horizontally extended open tailgate 22 of the truck thereby permitting the work platform to be effectively employed by the user without hindrance.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A bed extender for a pickup truck having a hollow receiver trailer hitch, a flat bed and a rear tailgate, which tailgate moves between an upright closed position and an open, generally horizontal extended position from the flat bed, said extender comprising a cantilevered elongated support bar and a rack, said cantilevered support bar having first and second ends, said support bar removably secured to the trailer hitch at its first end and having an open ended receiver at its second end, said open ended receiver angled so that it is elevated above the trailer hitch, said rack having a horizontal cross bar with first and second ends, at each of which is removably secured an L-shaped arm, said arms slidably received in the horizontal cross bar and having a plurality of spaced apart holes arranged in two orthogonal sets by means of which each arm is removably secured with a pin to the horizontal cross bar for adjusting the spacing between said arms and for positioning the arms vertically or horizontally, said horizontal cross bar supported by a leg which is slidably received in the open ended receiver, said leg having a plurality of spaced apart holes for removably securing the leg with a pin to the open ended receiver and adjusting the height of the horizontal cross bar level with respect to the flat bed, said support bar adapted to space the rack a distance from a pickup truck that a tailgate can freely move between its upright closed and open, generally horizontal extended position.

2. The bed extender of claim 1 wherein the elongated support bar is formed of angled sections for elevating the vertical open ended receiver above the receiver trailer hitch.

3. The bed extender of claim 2 wherein substantially the entire elongated support bar and rack are formed from square tubing.

* * * * *